(12) United States Patent  
Terada et al.

(10) Patent No.: US 9,360,833 B2  
(45) Date of Patent: Jun. 7, 2016

(54) CHARGING MEMBER, PROCESS CARTRIDGE AND ELECTROPHOTOGRAPHIC APPARATUS

(71) Applicant: CANON KABUSHIKI KAISHA, Tokyo (JP)

(72) Inventors: Kenya Terada, Suntou-gun (JP); Masaaki Harada, Yokohama (JP); Hiroaki Watanabe, Odawara (JP); Takumi Furukawa, Susono (JP); Keiji Nose, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/946,154

(22) Filed: Jul. 19, 2013

(65) Prior Publication Data

US 2013/0310239 A1 Nov. 21, 2013

Related U.S. Application Data

(63) Continuation of application No. PCT/JP2012/008064, filed on Dec. 18, 2012.

(30) Foreign Application Priority Data

Mar. 16, 2012 (JP) .................................. 2012-060315  
Dec. 12, 2012 (JP) .................................. 2012-271430

(51) Int. Cl.
*G03G 15/02* (2006.01)  
*G03G 21/18* (2006.01)  
*C08J 7/12* (2006.01)

(52) U.S. Cl.
CPC ............. *G03G 21/1853* (2013.01); *C08J 7/123* (2013.01); *G03G 15/02* (2013.01); *G03G 15/0233* (2013.01); *C08J 2309/02* (2013.01); *C08J 2409/00* (2013.01); *Y10T 428/31931* (2015.04)

(58) Field of Classification Search
None  
See application file for complete search history.

(56) References Cited

U.S. PATENT DOCUMENTS 5,198,685 A 3/1993 Kitani et al.  
5,283,294 A * 2/1994 Hsu et al. .................... 525/247

(Continued)

FOREIGN PATENT DOCUMENTS

CN 101178556 A 5/2008  
CN 104024957 A 9/2014

(Continued)

OTHER PUBLICATIONS

Oishi et al., Machine Translation of JP 09-160355 A, Jun. 1997.*

(Continued)

*Primary Examiner* — Callie Shosho  
*Assistant Examiner* — Daniel D. Lowrey  
(74) *Attorney, Agent, or Firm* — Fitzpatrick, Cella, Harper and Scinto (57) ABSTRACT

The present invention provides a charging member having an elastic layer on a surface thereof in which occurrence of compression set is reduced. The charging member includes an electro-conductive support and an elastic layer provided on the support as a surface layer, wherein the elastic layer is a rubber layer made of a crosslinked product of a rubber mixture including acrylonitrile butadiene rubber and polybutadiene, the polybutadiene includes 1,2-syndiotactic polybutadiene, and the elastic layer is formed by irradiating a surface of the rubber layer with electron rays.

5 Claims, 3 Drawing Sheets

(56) References Cited

U.S. PATENT DOCUMENTS

| | | | |
|---|---|---|---|
| 6,011,117 A * | 1/2000 | Perkins et al. | 525/99 |
| 6,078,778 A | 6/2000 | Murata et al. | |
| 6,150,025 A | 11/2000 | Roe et al. | |
| 7,486,911 B2 | 2/2009 | Harada | |
| 7,693,457 B2 | 4/2010 | Kuruma et al. | |
| 7,713,672 B2 | 5/2010 | Watanabe et al. | |
| 7,962,068 B2 | 6/2011 | Kuroda et al. | |
| 8,440,307 B2 | 5/2013 | Nose et al. | |
| 8,445,113 B2 | 5/2013 | Furukawa et al. | |
| 8,481,167 B2 * | 7/2013 | Watanabe et al. | 428/500 |
| 8,491,994 B2 | 7/2013 | Harada et al. | |
| 8,501,312 B2 | 8/2013 | Watanabe et al. | |
| 8,532,535 B2 | 9/2013 | Nose et al. | |
| 8,538,298 B2 | 9/2013 | Harada et al. | |
| 8,685,601 B2 | 4/2014 | Nose et al. | |
| 2001/0046576 A1 * | 11/2001 | Gloyer et al. | 428/36.91 |
| 2011/0176833 A1 | 7/2011 | Harada et al. | |
| 2012/0076539 A1 | 3/2012 | Sato et al. | |
| 2012/0177408 A1 * | 7/2012 | Watanabe et al. | 399/176 |
| 2013/0272747 A1 | 10/2013 | Watanabe et al. | |
| 2013/0287444 A1 | 10/2013 | Suzuki et al. | |

FOREIGN PATENT DOCUMENTS

| | | | |
|---|---|---|---|
| EP | 0 735 438 A2 | 10/1996 | |
| EP | 1 408 376 A1 | 4/2004 | |
| EP | 2 639 646 A1 | 9/2013 | |
| EP | 2 730 977 A1 | 5/2014 | |
| JP | 6-172590 A | 6/1994 | |
| JP | 09160355 A * | 6/1997 | |
| JP | EP0825227 A1 * | 2/1998 | |
| JP | 2010-54848 A | 3/2010 | |
| JP | 2012-63590 A | 3/2012 | |

OTHER PUBLICATIONS

PCT International Search Report and Written Opinion of the International Searching Authority, International Application No. JP2012/008064, Mailing Date Feb. 19, 2013.

Morrison and Boyd, Organic Chemistry, 5th Ed., 1987, pp. 1246-1249.

Harada, et al., U.S. Appl. No. 13/843,892, filed Mar. 15, 2013.

Nose, et al., U.S. Appl. No. 13/911,806, filed Jun. 6, 2013.

Harada, et al., U.S. Appl. No. 13/695,781, filed Nov. 1, 2012.

International Preliminary Report on Patentability, International Application No. PCT/JP2012/008064, Mailing Date Sep. 25, 2014.

European Search Report dated May 19, 2015 in European Application No. 12871447.4.

Chinese Office Action dated Nov. 3, 2015 in Chinese Application No. 201280071501.8.

* cited by examiner

CHARGING MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2012/008064, filed Dec. 18, 2012, which claims the benefit of Japanese Patent Application Nos. 2012-060315, filed Mar. 16, 2012, and 2012-271430, filed Dec. 12, 2012.

BACKGROUND OF THE INVENTION

1. Field of the Invention

The present invention relates to a charging member used in contact with a photosensitive member in an electrophotographic apparatus, a process cartridge and an electrophotographic apparatus.

2. Description of the Related Art

As a charging member working as an electrophotographic member used for contact charging, one having an elastic layer of rubber, a thermoplastic elastomer or the like coated on a support is generally used for securing uniform nip with a photosensitive member and suppressing damage of the photosensitive member. Since the rubber or the thermoplastic elastomer has high viscosity, however, if the elastic layer is used as a surface layer, a toner or an external additive may be adhered onto the surface of the charging member and may harmfully affect the quality of images to be formed. For overcoming this problem, Japanese Patent Application Laid-Open No. H09-160355 discloses a charging member including an elastic layer having a surface irradiated with UV or electron rays.

SUMMARY OF THE INVENTION

The present inventors examined a charging member using acrylonitrile butadiene rubber (NBR) as a component of an elastic layer. As a result, if the NBR is used as the only one rubber component, since the NBR has a polar group, a toner or an external additive is liable to adhere to the surface of the elastic layer. Even when the elastic layer is subjected to surface modification as described in Japanese Patent Application Laid-Open No. H09-160355, there still remains room for improvement.

Therefore, for overcoming this problem, the present inventors attempted to use butadiene rubber (BR) having no polar group as raw rubber for an elastic layer in addition to the NBR. As a result, in an elastic layer formed by using a rubber compound including the NBR and the BR as raw rubber, the adhesion of a toner or the like onto the surface of the elastic layer could be effectively suppressed.

The present inventors have, however, found that a new problem arises from the use of the BR as the raw rubber. Specifically, an elastic layer formed by using the rubber compound including the NBR and the BR as the raw rubber and irradiating the surface thereof with electron rays, compression set could be sometimes easily caused as compared with an elastic layer including the NBR as the only one rubber component and formed by irradiating the surface thereof with electron rays.

When a charging member is left to stand still in contact with an electrophotographic photosensitive member for a long period of time, deformation that cannot be easily recovered, namely, compression set, may be sometimes caused in a part of a surface layer of the charging member. Hereinafter, the "compression set" will be abbreviated as the "C set". In a charging member having the C set, there arises a difference in charging performance for an electrophotographic photosensitive member between a portion having the C set and a portion not having the C set, and the difference in the charging performance may appear as stripe-shaped unevenness in an electrophotographic image.

The present inventors have found that it is necessary to further improve the C set in a charging member having an elastic layer formed by using the rubber compound including the NBR and the BR as the raw rubber and irradiating the surface thereof with electron rays. Accordingly, the present invention is directed to providing an electrophotographic member working as a charging member having an elastic layer in which adhesion of a toner or an external additive onto a surface thereof is suppressed even through long-term usage and occurrence of the C set is suppressed.

Further, the present invention is directed to providing a process cartridge and an electrophotographic apparatus capable of stably forming high quality electrophotographic images.

According to one aspect of the present invention, there is provided an electrophotographic member comprising an electro-conductive support and an elastic layer provided on the support as a surface layer, wherein the elastic layer is a rubber layer made of a crosslinked product of a rubber mixture comprising acrylonitrile butadiene rubber and polybutadiene, the polybutadiene includes 1,2-syndiotactic polybutadiene, and the elastic layer is formed by irradiating a surface of the rubber layer with electron rays.

According to another aspect of the present invention, there is provided a process cartridge including a charging member integrated with an electrophotographic photosensitive member disposed to be chargeable by the charging member, the process cartridge having a structure removably attached to a main body of an electrophotographic apparatus, wherein the charging member is the aforementioned electrophotographic member.

According to further aspect of the present invention, there is provided an electrophotographic apparatus including a charging member and an electrophotographic photosensitive member disposed to be chargeable by the charging member, wherein the charging member is the aforementioned electrophotographic member.

According to the present invention, a charging member in which the adhesion of a toner or an external additive onto the surface thereof may be suppressed and the C set is minimally caused can be obtained.

Furthermore, according to the present invention, a process cartridge and an electrophotographic apparatus capable of stably forming high quality electrophotographic images can be obtained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors earnestly studied, and as a result of that, it has been found that the aforementioned objects can be satisfactorily achieved by using BR including 1,2-syndiotactic polybutadiene, that is, a crystalline butadiene resin, as polybutadiene (BR) used as a raw material for an elastic layer.

Here, the 1,2-syndiotactic polybutadiene includes a unit represented by the following formula (1):

Formula (1)

In general, polybutadiene obtained by binding butadiene includes, in addition to a 1,2-vinyl bond represented by the above-described formula (1), a cis-1,4 bond represented by the following formula (2) and a trans-1,4 bond represented by the following formula (3):

Formula (2)

Formula (3)

The 1,2-vinyl bond has smaller intermolecular bond energy than the cis-1,4 bond and the trans-1,4 bond. Therefore, a double bond via the 1,2-vinyl bond is relatively easily cleaved through electron rays irradiation as compared with the cis-1,4 bond and the trans-1,4 bond. Therefore, it can be said that the 1,2-vinyl bond is a site more largely contributing to development of the crosslinked structure of the polybutadiene.

The polybutadiene of the present invention includes the 1,2-syndiotactic polybutadiene having, as a constitutional unit, the 1,2-vinyl bond that is easily cleaved through electron rays irradiation and can better develop the crosslinked structure of the polybutadiene as described above. Accordingly, the cleavage through the electron rays irradiation and the development of the crosslinked structure accompanying the cleavage can be extremely efficiently proceeded.

As a result, an electrophotographic member that includes, as a surface layer, an elastic layer having higher crosslink density in a surface portion than in an inside portion and having a large difference in hardness between an outermost surface portion and the inside portion, and can suppress, at high level, both the adhesion of a toner or an external additive onto the surface thereof and occurrence of the C set can be obtained.

Figure 1:
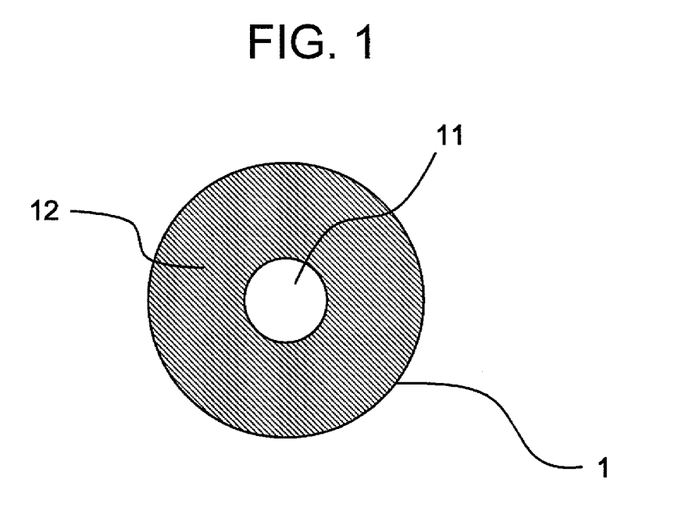
FIG. 1 is an exemplary cross-sectional view of a charging member according to the present invention.

The present invention will now be described. FIG. 1 is a cross-sectional view of a charging roller corresponding to the electrophotographic member according to the present invention. The charging roller 1 includes an electro-conductive support 11 and a conductive elastic layer 12 corresponding to a surface layer formed on the support.

<Electro-Conductive Support>

The electro-conductive support can be appropriately selected from members known in the field of electrophotographic apparatuses that can support the elastic layer provided thereon and can allow a current necessary for charging to pass therethrough. Examples of a material for the electro-conductive support include metals such as iron, aluminum, titanium, copper and nickel, and alloys including these metals such as carbon steel, stainless steel, duralumin, brass and bronze.

<Elastic Layer>

The elastic layer is formed by irradiating, with electron rays, a surface of a rubber layer made of a crosslinked product of a rubber mixture having a matrix including acrylonitrile butadiene rubber (NBR) and a domain including butadiene rubber containing 1,2-syndiotactic polybutadiene. Here, the 1,2-syndiotactic polybutadiene of the butadiene rubber can have a microcrystalline structure. In other words, microcrystals of the 1,2-syndiotactic polybutadiene that is a crystalline butadiene resin can be dispersed in the butadiene rubber.

A mixing ratio in the rubber mixture between the NBR and the butadiene rubber can be 90 parts by mass:10 parts by mass to 20 parts by mass:80 parts by mass, and is particularly preferably 80 parts by mass:20 parts by mass to 55 parts by mass:45 parts by mass.

When a ratio of the butadiene rubber in the elastic layer is increased, the polarity of a surface portion of the elastic layer is liable to lower, which is advantageous to the suppression of the adhesion of a toner or the like. On the other hand, when a ratio of the NBR in the elastic layer is increased, a crosslinked structure obtained on the surface of the elastic layer through the electron rays irradiation is more highly developed, which is advantageous to the suppression of the occurrence of the C set.

<<Polybutadiene Including Crystalline Butadiene Resin>>

The butadiene of the present invention includes, as the crystalline butadiene resin, 1,2-syndiotactic polybutadiene having the unit represented by the above-described formula (1).

Furthermore, as the polybutadiene of the present invention, a composite elastomer in which domains each including crystals of the 1,2-syndiotactic polybutadiene having the constitutional unit represented by the formula (1) are dispersed in matrix rubber mainly including the cis-1,4 bond represented by the formula (2) and the trans-1,4 bond represented by the formula (3) can be used.

Specifically, the composite elastomer has a structure in which domains of crystals of 1,2-syndiotactic polybutadiene are dispersed in the form of filaments in the matrix including the cis-1,4 bond and the trans-1,4 bond. It is presumed that chemical and physical interaction is caused between the matrix and the domain in the elastomer having such a structure so as to improve the strength, more specifically, the elastic modulus in tension, of the elastomer.

When the surface of the rubber layer including this elastomer is irradiated with electron rays, a crosslinked structure of the crystalline domain including the 1,2 bond and the matrix including the 1,4 bond in a molecule of the polybutadiene is efficiently formed. As a result, an elastic layer having a surface with higher hardness can be obtained. Besides, since the elastomer has the high elastic modulus in tension for the aforementioned reason, the occurrence of the C set can be extremely effectively suppressed.

In the composite elastomer, the content of the 1,2-syndiotactic polybutadiene can be 3.8 mass % or more and 20 mass % or less. Thus, an effect to suppress the occurrence of the C set and an effect to suppress the occurrence of charge failure derived from insufficient contact with a photosensitive member shown by the charging member of the present invention can be more definitely exhibited. Incidentally, since the 1,2-syndiotactic polybutadiene is insoluble in n-hexane, the content of the 1,2-syndiotactic polybutadiene in the composite polybutadiene can be calculated by weighing an insoluble matter obtained by dissolving the composite polybutadiene in n-hexane.

Here, the cis-1,4 bond, the trans-1,4 bond and the 1,2-vinyl bond are included also in a bonding form (a bonding structure) of an amorphous butadiene rubber portion soluble in n-hexane. As the content of the cis-1,4 bond represented by the formula (2) in the matrix is higher, the tensile strength and extension at break of the crosslinked product are liable to be larger. Therefore, in the butadiene of the present invention, the content of the cis-1,4 bond in an n-hexane-soluble matter can be 94 mass % or more and 99 mass % or less. When the content of the cis-1,4 bond in the matrix falls in this range, the elastic layer of the present invention can attain particularly excellent mechanical strength.

The polybutadiene including the crystalline butadiene resin described so far can be synthesized by, for example, the following method. Butadiene is polymerized in an inert organic solvent by using a polymerization catalyst including a cobalt compound and a halogen-containing organic aluminum compound, so as to obtain polybutadiene including a cis-1,4 bond. Subsequently, a cobalt compound-based polymerization catalyst is added to this polymerization system, so as to produce 1,2-syndiotactic polybutadiene. Thereafter, an unreacted monomer and the solvent are removed from the resultant polymerization solution, so as to obtain the composite elastomer.

Besides, the composite elastomer is commercially available as "VCR412", "VCR617", "VCR450" and "VCR800" (all trade names, manufactured by Ube Industries Ltd.).

<<NBR>>

The acrylonitrile butadiene rubber (NBR) is a copolymer of acrylonitrile and 1,3-butadiene, and includes a 1,2-vinyl bond, a cis-1,4 bond and a trans-1,4 bond in a butadiene skeleton.

Since the NBR is excellent in processability and wearing characteristics, the NBR is rubber suitably used as a component of an elastic layer. Since the NBR has, however, high polarity, a toner or an external additive is liable to adhere onto a rubber layer including the NBR as the only one rubber component. This liability can be improved by modifying a surface of the rubber layer through electron rays irradiation, but there still remains room for improvement.

The characteristics of the NBR vary depending upon the copolymerization ratio between acrylonitrile and butadiene in the NBR molecule. As the ratio of acrylonitrile is larger, the molecular motion of the NBR is lowered, which is advantageous to suppression of exudation of a low-molecular component from the elastic layer and suppression of degradation of the elastic layer caused by ozone or the like. On the other hand, as the ratio of the butadiene component is larger, hardness increase of the elastic layer caused under a cold environment can be suppressed.

Furthermore, in the present invention, NBR into which a third monomer other than the butadiene and the acrylonitrile is introduced for arbitrary modification, such as carboxylated NBR obtained by introducing methacrylic acid (XNBR), NBIR obtained by replacing a part of butadiene by isoprene, hydrogenated nitrile rubber (HNBR) obtained by chemically hydrogenating a part of remaining double bonds included in butadiene present in a polymer main chain of NBR, or partially crosslinked NBR, can be used.

In the present invention, the elastic layer can include carbon black as conductive particles. The content of the carbon black can be adjusted so as to attain a desired value of electric resistance of the elastic layer.

The type of carbon black to be included is not particularly limited, and specific examples include conductive carbon black such as ketjen black and acetylene black; and carbon black for rubber such as SAF, ISAF, HAF, FEF, GPF, SRF, FT and MT.

Moreover, the material for the elastic layer can include, if necessary, a filler, a process aid, a crosslinking aid, a crosslinking accelerator, a crosslinking accelerator aid, a crosslinking retarder, a softening agent, a plasticizer, a dispersing agent and the like generally used as a compound ingredient of rubber.

Examples of a method for mixing these materials include a mixing method using an enclosed mixer such as a Banbury mixer or a pressure kneader, and a mixing method using an open mixer such as an open roll mill.

The method for forming the elastic layer may include, for example, a method where an unvulcanized semiconductive rubber composition is extruded into a tube shape by an extruder, the extruded composition is vulcanized by a vulcanizer, and a mandrel is pressed into the vulcanized composition, the surface of which is then ground for attaining a desired outer diameter. Another method may be mentioned, for example, where a semiconductive rubber composition obtained before vulcanization is extruded together with a mandrel by an extruder equipped with a crosshead into a cylindrical shape with the mandrel set in the center, and the resultant is fixed within a die having a desired outer diameter, and heated to obtain a formed product.

The formed roller can be subjected to a grinding treatment for the surface thereof. As a method for grinding the surface of the roller, for example, a traverse grinding method for grinding the roller with a grind stone or the roller moved in a thrust direction can be employed. Alternatively, a plunge cut shaving method for shaving the roller without reciprocating a grinding wheel with a width larger than the length of the roller while rotating the roller around the axis of the mandrel can be employed. The plunge cut cylindrical shaving method is more preferably employed because this method has an advantage that the whole width of the elastic roller can be ground at the same time and hence the processing time can be shorter than in the traverse cylindrical grinding method.

The surface of the roller is subjected to a curing treatment through electron rays irradiation.

Figure 3:
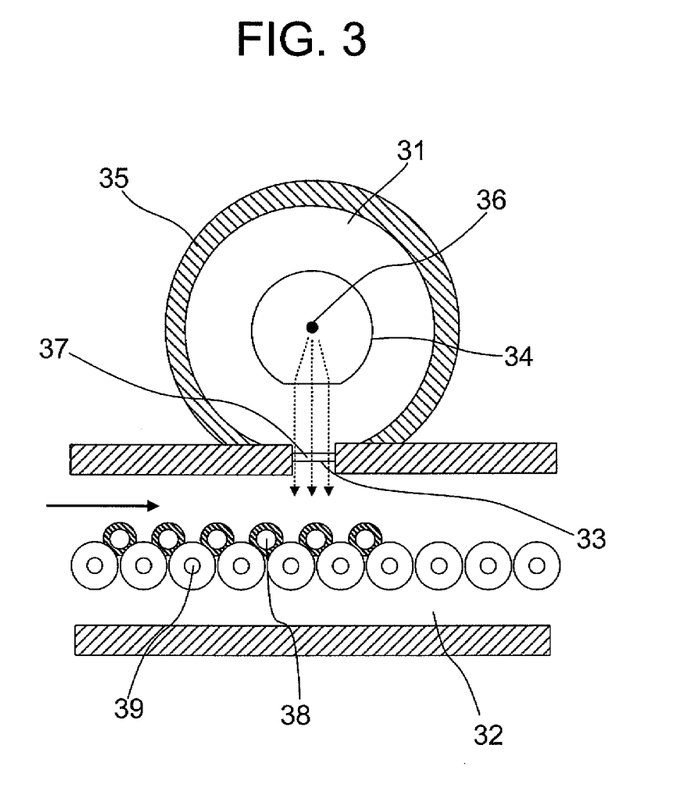
FIG. 3 is a schematic diagram of an electron rays irradiation apparatus.

FIG. 3 is a schematic diagram of an electron rays irradiation apparatus.

The electron rays irradiation apparatus used in the present invention irradiates, with electron rays, a surface of a roller while rotating the roller, and includes, as illustrated in FIG. 3, an electron rays generating part 31, an irradiation chamber 32 and an irradiation port 33.

The electron rays generating part 31 includes a terminal 34 for generating electron rays and an accelerating tube 35 for accelerating the electron rays generated by the terminal 34 within a vacuum space (an acceleration space). Furthermore, the inside of the electron rays generating part is kept in a vacuum of $10^{-3}$ to $10^{-6}$ Pa by a vacuum pump or the like not shown for avoiding energy loss caused through collision of electrons against gas molecules.

When a current is supplied to a filament 36 from a power source not shown for heating, the filament 36 radiates thermoelectrons, and merely thermoelectrons passing through the terminal 34 among these thermoelectrons are effectively taken out as electron rays. The electron rays are accelerated in the acceleration space within the accelerating tube 35 by an acceleration voltage for the electron rays, and the accelerated electron rays break through an irradiation port foil 37, so as to irradiate a rubber roller 38 conveyed within the irradiation chamber 32 disposed below the irradiation port 33.

When the rubber roller 38 is irradiated with the electron rays as in this embodiment, the atmosphere inside the irradiation chamber 32 is a nitrogen atmosphere. Furthermore, the rubber roller 38 is rotated by a roller rotating member 39 so as to be moved by a conveying unit in the irradiation chamber from left to right in FIG. 3. Incidentally, a lead shield not shown is provided around the electron rays generating part 31 and the irradiation chamber 32 so that X-rays secondarily generated during the electron rays irradiation cannot be externally leaked.

The irradiation port foil 37 is made of a metal foil, and works to divide the vacuum atmosphere within the electron rays generating part and the air atmosphere within the irradiation chamber and to take the electron rays out to the irradiation chamber therethrough. When the electron rays are used for the irradiation of the roller, the atmosphere within the irradiation chamber 32 where the roller is irradiated with the electron rays is a nitrogen atmosphere. Therefore, the irradiation port foil 37 provided on the boundary between the electron rays generating part 31 and the irradiation chamber 32 can have no pin hole, sufficient mechanical strength for keeping the vacuum atmosphere within the electron rays generating part and good transparency to electron rays. For this purpose, the irradiation port foil 37 can be made of a metal having small specific gravity and a small thickness and is generally made of an aluminum or titanium foil.

The conditions for the curing treatment performed by using the electron rays are determined according to the acceleration voltage and radiation dose of the electron rays. The acceleration voltage affects the depth to be subjected the curing treatment, and as the condition of the acceleration voltage employed in the present invention, the acceleration voltage can be in a low energy region of 40 to 300 kV. When the acceleration voltage is 40 kV or more, a sufficient treatment thickness for achieving the effects of the present invention can be attained. Furthermore, when the acceleration voltage is 300 kV or less, the electron rays irradiation apparatus can be prevented from increasing in the size so as to prevent increase of apparatus cost. As a more preferable condition, the acceleration voltage can be 80 to 150 kV.

The radiation dose of the electron rays employed in the electron rays irradiation is defined according to the following equation (1):

$$D = (K \cdot I)/V \quad (1)$$

wherein D represents a radiation dose (kGy), K represents an apparatus constant, I represents an electron current (mA), and V represents a treatment speed (m/min). The apparatus constant K is a constant corresponding to efficiency of an individual apparatus and is an index of performance of the apparatus. The apparatus constant K can be obtained by measuring radiation doses under a prescribed acceleration voltage condition with the electron current and the treatment speed varied. The radiation dose of the electron rays was measured by adhering a dose measuring film onto a surface of a roller, actually treating the resultant roller with the electron rays irradiation apparatus, and measuring the radiation dose of the measuring film adhered to the roller surface with a film dosimeter. The used dose measuring film was FWT-60 and the used film dosimeter was FWT-92D (both manufactured by Far West Technology, Inc.).

Figure 2:
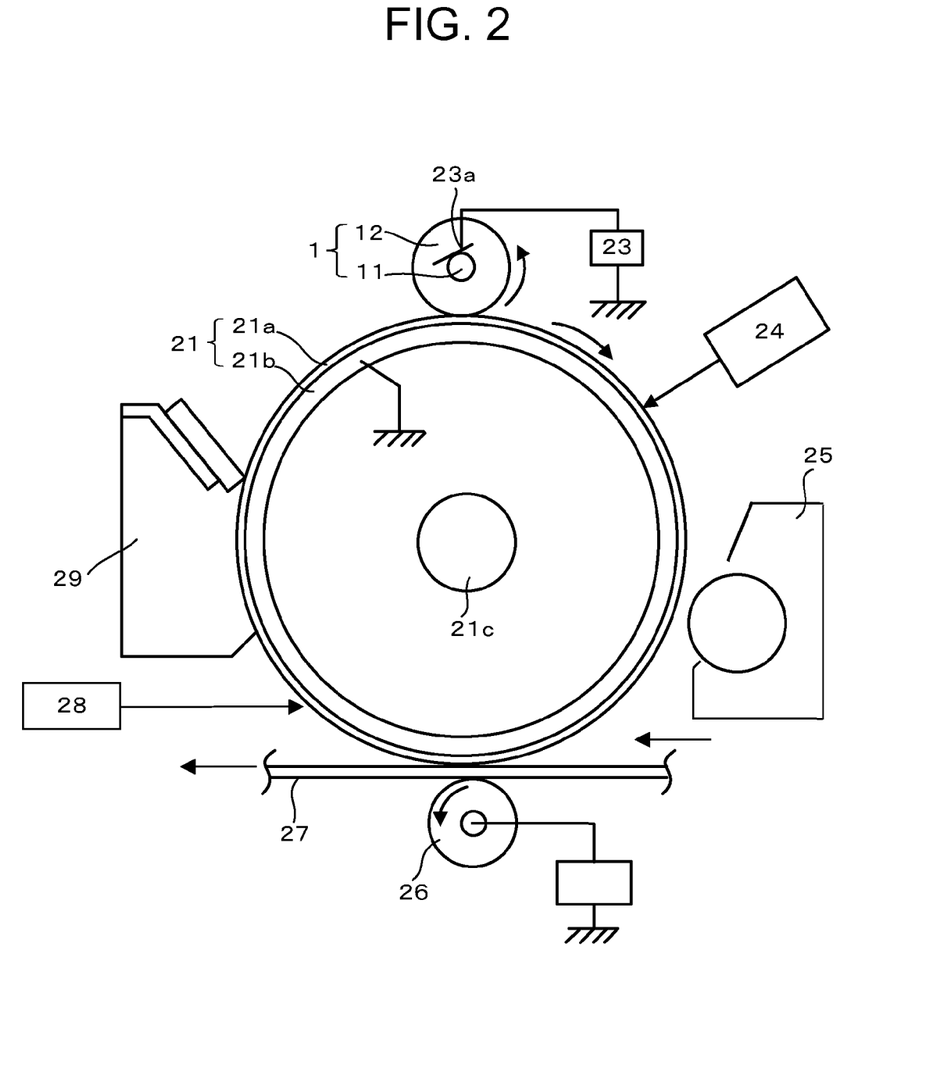
FIG. 2 is an exemplary cross-sectional view of an electrophotographic apparatus according to the present invention.

FIG. 2 is a cross-sectional view of an electrophotographic apparatus according to the present invention. A reference sign 21 denotes an electrophotographic photosensitive member corresponding to a member to be charged, and the electrophotographic photosensitive member of this exemplary structure is a drum-shaped electrophotographic photosensitive member including, as basic constitutional layers, an electro-conductive support 21b of aluminum or the like having conductivity and a photosensitive layer 21a formed on the electro-conductive support 21b. The electrophotographic photosensitive member is driven to rotate at a prescribed circumferential speed around an axis 21c in a clockwise direction taken from above. A reference sign 1 denotes a charging roller, which corresponds to the charging member of the present invention.

The charging roller 1 is disposed in contact with the electrophotographic photosensitive member 21 and charges (for primary charge) the chargeable electrophotographic photosensitive member to prescribed polarity/potential. The charging roller 1 includes a mandrel 11 and a conductive elastic layer 12 formed on the mandrel 11, is pressed against the electrophotographic photosensitive member 21 with both ends of the mandrel 11 pressed by a pressing unit not shown, and is driven to be rotated according to the rotation of the electrophotographic photosensitive member 21. The electrophotographic photosensitive member 21 is contact charged to the prescribed polarity/potential by applying a prescribed current (DC) bias to the mandrel 11 by a rubbing power source 23a connected to a power source 23.

The electrophotographic photosensitive member 21 thus charged on a circumferential face thereof by the charging roller 1 is subsequently subjected to exposure (such as laser beam scanning exposure or slit exposure of an original image) for objective image information by an exposure unit 24, so that an electrostatic latent image corresponding to the objective image information can be formed on the circumferential face thereof. The electrostatic latent image is successively visualized as a toner image by a developing member 25. The toner image is successively transferred, by a transferring unit 26, onto a transfer material 27 that is conveyed from a paper feeding unit not shown to a transfer section present between the electrophotographic photosensitive member 21 and the transferring unit 26 at appropriate timing in synchronization with the rotation of the electrophotographic photosensitive member 21. The transferring unit 26 of this exemplary structure is a transferring roller, and the toner image formed on the electrophotographic photosensitive member 21 is transferred onto the transfer material 27 by charging the transfer material 27 to polarity opposite to the polarity of the toner from a rear side of the transfer material 27.

The transfer material 27 having the toner image transferred onto the front face thereof is separated from the electrophotographic photosensitive member 21 to be conveyed to a fixing unit not shown for fixing the toner image, and is ultimately output as an image formed material. Alternatively, if an image is to be formed also on the rear face, the transfer material is conveyed to a unit for reconveying to the transfer section.

The circumferential face of the electrophotographic photosensitive member 21 is subjected to pre-exposure by a pre-exposure unit 28 after transferring the image, so that remaining charge may be removed (eliminated) from the electrophotographic photosensitive drum. After transferring the image, the circumferential face of the electrophotographic photosensitive member 21 is cleaned by removing transfer remaining toner and the like by a cleaning member 29, so as to be repeatedly used for image formation. The cleaning member 29 includes an elastic blade.

The internal hardness of the charging roller was measured with a micro rubber hardness tester (trade name: MD-1 capa, manufactured by Kobunshi Keiki Co., Ltd.) in a peak hold mode under an environment of 23° C./55% RH (relative humidity). More specifically, the charging member was placed on a metal plate and simply fixed thereon by putting a metal block so as not to tumble, and a measurement terminal was abutted accurately against the center of the charging member in a vertical direction to the metal plate, so as to read a value obtained after 5 seconds. This operation was performed in nine positions in total, that is, both end positions away from the ends of the rubber layer by 30 to 40 mm and the center positions of the charging member, which all consist respective three portions along the circumferential direction of the charging member, and an average of the thus measured values was defined as the hardness of the elastic layer. Here, MD-1 hardness can be 55 to 85°. When the MD-1 hardness is 55° or more, occurrence of an image failure derived from the C set caused because of excessive softness of the elastic layer can be suppressed. Furthermore, when the MD-1 hardness is 85° or less, occurrence of an image failure derived from contamination unevenness caused because of excessive hardness of the elastic layer can be suppressed.

The surface hardness of the charging roller was measured as universal hardness. The measurement was conducted by using a ultra-micro hardness tester (trade name: H-100V, manufactured by Fischer Instruments K.K.), and diamond in the shape of a quadrangular pyramid was used as an indenting tool. An indentation speed was set according to the following equation (2).

$$dF/dt = 1000 \text{ mN}/240 \text{ s} \quad (2)$$

(wherein F represents force and t represents time.)

Maximum hardness attained up to an indentation depth of the indenting tool of 10 μm was defined as the surface hardness. Here, the universal hardness attained after the electron rays irradiation can be 2.0 to 20.0 N/mm². When the universal hardness attained after the electron rays irradiation falls in this range, the crosslink density on the surface of the elastic layer can be sufficiently increased. This contributes to more definite suppression of the occurrence of the C set. Besides, this contributes to more definite suppression of the adhesion of a toner or an external additive onto the surface of the charging member.

Process Cartridge

Figure 4:
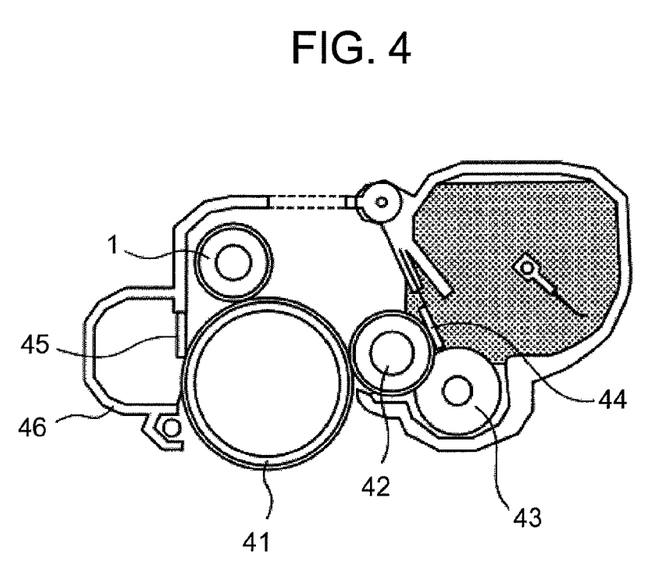
FIG. 4 is an explanatory diagram of a process cartridge according to the present invention.

A process cartridge of the present invention may include the charging member integrated with an electrophotographic photosensitive member disposed to be chargeable by the charging member, and may have a structure removably attached to a main body of an electrophotographic apparatus. As an example of such a structure, a charging apparatus including a photosensitive member 41 and a charging roller 1, a developing apparatus including a developing roller 42, a toner supplying roller 43 and a developing blade 44, a cleaning apparatus 46 including a cleaning blade 45, and the like are integrated with one another as illustrated in FIG. 4, so as to be removably attached to an electrophotographic apparatus.

Example

The present invention will now be described in more details based on examples, which do not limit the invention. In the following description, "part(s)" means "part(s) by mass" unless otherwise mentioned, and commercially available highly pure products were used as reagents and the like not particularly specified.

Furthermore, as for various polybutadienes used in the examples, contents of the 1,2-syndiotactic butadiene calculated based on an n-hexane insoluble matter are shown in Table 1 below. Besides, mass ratios of the cis-1,4 bond and the trans-1,4 bond in an n-hexane-soluble matter are also shown in Table 1.

TABLE 1

| Trade name | Content of 1,2-syndiotactic polybutadiene (mass %) | Content of cis-1,4 bond (mass %) | Content of trans-1,4 bond (mass %) |
| --- | --- | --- | --- |
| VCR412 | 12.0 | 98 | 1 |
| VCR617 | 17.0 | 98 | 1 |
| VCR450 | 3.8 | 98 | 1 |
| VCR800 | 5.3 | 98 | 1 |

Example 1

Preparation of Rubber Material

Materials shown in Table 2 below were mixed with a 6-liter pressure kneader at a filling ratio of 65 vol % and a blade speed of 30 rpm for 21 minutes, so as to obtain an unvulcanized rubber composition.

TABLE 2

| Materials | Content (parts by mass) |
| --- | --- |
| NBR (trade name: N230SV, manufactured by JSR Corporation), content of acrylonitrile: 33% | 90 |
| Butadiene rubber (trade name: VCR412, manufactured by Ube Industries Ltd.) | 10 |
| Carbon black (trade name: Tokablack #7360SB, manufactured by Tokai Carbon Co., Ltd.) | 48 |
| Zinc oxide used as vulcanization accelerator | 5 |
| Zinc stearate used as process aid | 1 |
| Calcium carbonate (trade name: #30, manufactured by Maruo Calcium Co., Ltd.) | 20 |

An unvulcanized rubber composition for an elastic layer was obtained by mixing 174 parts by mass of the thus obtained unvulcanized rubber composition, 1.2 parts of sulfur working as a crosslinking agent, 1.0 part of tetrabenzylthiuram disulfide (trade name: Nocceler TBzTD, manufactured by Ouchi Shinko Chemical Industrial Co., Ltd.) working as a vulcanization accelerator, and 1.0 part of N-t-butyl-2-benzothiazole sulfenimide (trade name: SANTOCURE-TBSI, manufactured by Flexsys, L.P.) with open rolls each having a diameter of 12 inches at a front roll speed of 8 rpm and a back roll speed of 10 rpm and at a roll distance of 2 mm for 20 minutes.

(Formation of Vulcanized Rubber Layer)

A conductive vulcanization adhesive (trade name: Metaloc U-20, manufactured by Toyo Kagaku Kenkyusho Co., Ltd.) was applied to an axially center portion with a length of 228 mm of a cylindrical face of a cylindrical conductive mandrel (of steel having a nickel-plated surface, manufactured by Micronseiko Co., Ltd.) with a diameter of 6 mm and a length of 252 mm, and the resultant was dried at 80° C. for 30 minutes.

Next, the aforementioned unvulcanized rubber composition and the electro-conductive support were simultaneously extruded by using an extruder equipped with a crosshead into a cylindrical shape with the electro-conductive support set coaxially in the center, so as to prepare an unvulcanized rubber roller in which the circumferential face of the electro-conductive support was coated with the unvulcanized rubber composition. The extruder used for the extrusion had a cylinder diameter of 45 mm and L/D of 20, and the temperature of a head was set to 100° C., the temperature of the cylinder was set to 110° C. and the temperature of a screw was set to 110° C. at the time of extrusion.

The thus obtained unvulcanized rubber roller was heated for vulcanization with a heating oven in the air at atmospheric pressure at a temperature of 160° C. for 30 minutes. Both ends of the rubber layer of the thus vulcanized roller were cut off into a length of a rubber portion of 232 mm. Thereafter, the rubber portion was ground with a grinding machine (trade name: LEO-F4-BME, manufactured by Minakuchi Machinery Works Ltd.), so as to obtain vulcanized rubber roller 1 having an elastic layer in a crown shape with a diameter of 8.4 mm at each end and a diameter of 8.5 mm at the center.

(Surface Curing Treatment for Vulcanized Rubber Layer Performed after Grinding)

The surface of the thus obtained vulcanized rubber roller 1 was irradiated with electron rays for a curing treatment, so as to obtain charging roller 1. The electron rays irradiation was performed by using an electron rays irradiation apparatus (manufactured by Iwasaki Electric Co., Ltd.) with a maximum acceleration voltage of 150 kV and a maximum electron current of 40 mA, and nitrogen gas purging was conducted at the time of irradiation. This treatment was conducted under conditions of an acceleration voltage of 150 kV, an electron current of 35 mA, a treatment speed of 1 m/min, and an oxygen concentration of 100 ppm.

(Measuring of MD-1 Hardness)

The surface hardness was measured with a MD-1 hardness tester before and after the electron rays irradiation. As a result, the MD-1 hardness was 69° before the electron rays irradiation and was 74° after the electron rays irradiation.

(Measurement of Surface Hardness)

The surface hardness was measured with a universal hardness tester before and after the electron rays irradiation. The measurement was conducted by using an ultra-micro hardness tester H-100V manufactured by Fischer Instruments K.K., and diamond in the shape of a quadrangular pyramid was used as an indenting tool. An indentation speed was set according to the following equation (3).

$$dF/dt = 1000 \text{ mN}/240 \text{ s} \quad (3)$$

(wherein F represents force and t represents time.)

The maximum hardness attained up to an indentation depth of the indenting tool of 10 μm was defined as the surface hardness.

As a result, the surface hardness was 1.0 N/mm² before the electron rays irradiation and was 5.7 N/mm² after the irradiation.

(Evaluation of Image Formation)

Two charging rollers of this example were prepared separately from the charging roller subjected to the aforementioned hardness evaluation.

(Evaluation 1)

One of the prepared charging rollers was incorporated into an electrophotographic process cartridge, the process cartridge was attached to an electrophotographic apparatus (trade name: LaserJet P1005, manufactured by Hewlett-Packard Development Company) for vertically outputting A4 size paper, and electrophotographic images were formed.

The image formation was conducted under an environment of a temperature of 23° C. and relative humidity of 50%.

An image output herein was an image of an alphabetic character "E" with a size of 4 points printed at a coverage rate of 1% on A4 size paper. Furthermore, the image formation was conducted in an intermittent mode. Here, the intermittent mode is a mode for repeating a cycle in which the rotation of an electrophotographic photosensitive member is stopped by taking 3 seconds after outputting every electrophotographic image. Thus, 1000 electrophotographic images were output. In each of the electrophotographic images, it was visually observed whether or not there was a vertical stripe-shaped failure derived from contamination of the surface of the charging roller with a toner or the like, and the observation result was evaluated based on the following criteria:

A: A defect was found in none of the 1000 electrophotographic images;
B: a defect was found in 1 or more and less than 50 electrophotographic images;
C: a defect was found in 50 or more and less than 200 electrophotographic images; and
D: a defect was found in 200 or more electrophotographic images.

(Evaluation 2)

The other of the prepared charging rollers was incorporated into the process cartridge of the aforementioned electrophotographic apparatus so that the charging roller might be in contact with an electrophotographic photosensitive member. The resultant process cartridge was left to stand still under an environment of a temperature of 40° C. and relative humidity of 95% for 30 days, and was subsequently left to stand still under an environment of a temperature of 25° C. and relative humidity of 50% for 48 hours. Thereafter, the process cartridge was attached to an electrophotographic apparatus (trade name: LaserJet P1005, manufactured by Hewlett-Packard Development Company) for forming electrophotographic images. The formation of electrophotographic images was conducted under an environment of a temperature of 23° C. and relative humidity of 50%, so as to output 20 halftone images. Thereafter, the electrophotographic apparatus was left to stand still under an environment of a temperature of 23° C. and relative humidity of 50% for 24 hours, and a halftone image was output again. Here, a halftone image is an image in which lines each with a width of one dot are drawn at intervals of two dots along a direction vertical to the rotation direction of the photosensitive member. As for the thus obtained 21 halftone images, it was visually observed whether or not there was a stripe-shaped failure caused when the charging roller had the C set, and the observation result was evaluated based on the following criteria:

A: No stripes or the like derived from the C set were found;
B: stripes or the like derived from the C set were extremely slightly found but this image failure completely disappeared after outputting the 20 images;
C: stripes or the like derived from the C set were slightly found but this image failure completely disappeared after leaving the apparatus for 24 hours although did not completely disappear after outputting the 20 images; and
D: stripes or the like derived from the C set were clearly found and this image failure did not completely disappear even after leaving the apparatus for 24 hours.

As a result of the image evaluation, the evaluation for contamination was ranked B. Besides, the evaluation for the C set was ranked A.

Example 2

A rubber material was prepared in the same manner as in Example 1 except that "VCR412" was replaced with "VCR617", and vulcanized rubber roller 2 was formed from the resultant unvulcanized rubber in the same manner as in Example 1.

The surface of the vulcanized rubber roller was subjected to the curing treatment through the electron rays irradiation in the same manner as in Example 1, so as to produce charging roller 2. The surface hardness was measured before and after the irradiation and the image evaluation was conducted. As a result, the surface hardness was 1.1 N/mm² before the electron rays irradiation and was 5.9 N/mm² after the irradiation. The evaluation for contamination was ranked B and the evaluation for the C set was ranked A.

Example 3

A rubber material was prepared in the same manner as in Example 1 except that "VCR412" was replaced with "VCR450", and vulcanized rubber roller 3 was formed from the resultant unvulcanized rubber in the same manner as in Example 1.

The surface of the vulcanized rubber roller was subjected to the curing treatment through the electron rays irradiation in the same manner as in Example 1, so as to produce charging roller 3. The surface hardness was measured before and after the irradiation and the image evaluation was conducted. As a result, the surface hardness was 0.9 N/mm² before the electron rays irradiation and was 5.3 N/mm² after the irradiation. The evaluation for contamination was ranked B and the evaluation for the C set was ranked A.

Example 4

A rubber material was prepared in the same manner as in Example 1 except that "VCR412" was replaced with "VCR800", and vulcanized rubber roller 4 was formed from the resultant unvulcanized rubber in the same manner as in Example 1.

The surface of the vulcanized rubber roller was subjected to the curing treatment through the electron rays irradiation in the same manner as in Example 1, so as to produce charging roller 4. The surface hardness was measured before and after the irradiation and the image evaluation was conducted. As a result, the surface hardness was 1.0 N/mm² before the electron rays irradiation and was 5.5 N/mm² after the irradiation. The evaluation for contamination was ranked B and the evaluation for the C set was ranked A.

Example 5

Vulcanized rubber roller 5 was produced in the same manner as in Example 1, and the surface of the vulcanized rubber roller was subjected to the curing treatment through the electron rays irradiation, so as to produce charging roller 5. The treatment was conducted under conditions of an acceleration voltage of 80 kV, an electron current of 35 mA, a treatment speed of 0.5 m/min and an oxygen concentration of 100 ppm.

The surface hardness was 1.0 N/mm² before the electron rays irradiation and was 4.3 N/mm² after the irradiation. The evaluation for contamination was ranked B and the evaluation for the C set was ranked B.

Example 6

Vulcanized rubber roller 6 was produced in the same manner as in Example 1, and the surface of the vulcanized rubber roller was subjected to the curing treatment through the electron rays irradiation, so as to produce charging roller 6. The treatment was conducted under conditions of an acceleration voltage of 120 kV, an electron current of mA, a treatment speed of 0.8 m/min and an oxygen concentration of 100 ppm.

The surface hardness was 1.0 N/mm² before the electron rays irradiation and was 5.0 N/mm² after the irradiation. The evaluation for contamination was ranked B and the evaluation for the C set was ranked B.

Example 7

A rubber material was prepared in the same manner as in Example 1 except that the content of "VCR412" was changed to 80 parts by mass and the content of N230SV was changed to 20 parts by mass, and vulcanized rubber roller 7 was formed from the resultant unvulcanized rubber in the same manner as in Example 1.

The surface of the vulcanized rubber roller was subjected to the curing treatment through the electron rays irradiation in the same manner as in Example 1, so as to produce charging roller 7. The surface hardness was measured before and after the irradiation and the image evaluation was conducted. As a result, the surface hardness was 1.5 N/mm² before the electron rays irradiation and was 18.7 N/mm² after the irradiation. The evaluation for contamination was ranked B and the evaluation for the C set was ranked A.

Example 8

A rubber material was prepared in the same manner as in Example 1 except that the content of "VCR412" was changed to 20 parts by mass and the content of N230SV was changed to 80 parts by mass, and vulcanized rubber roller 8 was formed from the resultant unvulcanized rubber in the same manner as in Example 1.

The surface of the vulcanized rubber roller was subjected to the curing treatment through the electron rays irradiation in the same manner as in Example 1, so as to produce charging roller 8. The surface hardness was measured before and after the irradiation and the image evaluation was conducted. As a result, the surface hardness was 1.1 N/mm² before the electron rays irradiation and was 7.6 N/mm² after the irradiation. The evaluation for contamination was ranked A and the evaluation for the C set was ranked A.

Example 9

A rubber material was prepared in the same manner as in Example 1 except that the content of "VCR412" was changed to 30 parts by mass and the content of N230SV was changed to 70 parts by mass, and vulcanized rubber roller 9 was formed from the resultant unvulcanized rubber in the same manner as in Example 1.

The surface of the vulcanized rubber roller was subjected to the curing treatment through the electron rays irradiation in the same manner as in Example 1, so as to produce charging roller 9. The surface hardness was measured before and after the irradiation and the image evaluation was conducted. As a result, the surface hardness was 1.1 N/mm² before the electron rays irradiation and was 9.4 N/mm² after the irradiation. The evaluation for contamination was ranked A and the evaluation for the C set was ranked A.

Example 10

A rubber material was prepared in the same manner as in Example 1 except that the content of "VCR412" was changed to 45 parts by mass and the content of N230SV was changed to 55 parts by mass, and vulcanized rubber roller 10 was formed from the resultant unvulcanized rubber in the same manner as in Example 1.

The surface of the vulcanized rubber roller was subjected to the curing treatment through the electron rays irradiation in the same manner as in Example 1, so as to produce charging roller 10. The surface hardness was measured before and after the irradiation and the image evaluation was conducted. As a result, the surface hardness was 1.2 N/mm² before the electron rays irradiation and was 12.2 N/mm² after the irradiation. The evaluation for contamination was ranked A and the evaluation for the C set was ranked A.

Comparative Example 1

Charging roller 11 was produced in the same manner as in Example 1 except that the surface of a vulcanized rubber roller was not subjected to the electron rays irradiation, and the image evaluation was conducted. As a result, the evaluation for contamination and the evaluation for the C set were both ranked D.

Comparative Example 2

Charging roller 12 was produced in the same manner as in Example 1 except that the polymers used in Example 1 were changed to 45 parts by mass of butadiene rubber (trade name: "BR1220L", manufactured by Zeon Corporation, with a content of 1,2-syndiotactic butadiene of 0 mass % and a content of a cis-1,4 bond in an n-hexane-soluble matter of 97 mass %) and 55 parts by mass of NBR.

The surface hardness was measured before and after the electron rays irradiation and the image evaluation was conducted. As a result, the surface hardness was 0.8 N/mm² before the electron rays irradiation and was 1.9 N/mm² after the irradiation. The evaluation for contamination was ranked A and the evaluation for the C set was ranked D.

Comparative Example 3

Charging roller 13 was produced in the same manner as in Example 1 except that the polymers used in Example 1 were changed to 100 parts by mass of NBR. The surface hardness was measured before and after the irradiation and the image evaluation was conducted. As a result, the surface hardness was 0.9 N/mm2 before the electron rays irradiation and was 3.8 N/mm2 after the irradiation. The evaluation for contamination was ranked D and the evaluation for the C set was ranked B.

The material compositions of the elastic layers employed in the respective examples and comparative examples and the evaluation results are shown in Tables 3 to 5 below.

TABLE 3

| | Examples | | | | |
|---|---|---|---|---|---|
| | 1 | 2 | 3 | 4 | 5 |
| NBR (trade name: "N230SV", content of acrylonitrile: 33%) | 90 | 90 | 90 | 90 | 90 |
| VCR412 | 10 | — | — | — | 10 |
| VCR617 | — | 10 | — | — | — |
| VCR450 | — | — | 10 | — | — |
| VCR800 | — | — | — | 10 | — |
| Carbon black (trade name: Tokablack #7360SB) | 48 | 48 | 48 | 48 | 48 |
| Zinc oxide | 5 | 5 | 5 | 5 | 5 |
| Zinc stearate | 1 | 1 | 1 | 1 | 1 |
| Calcium carbonate | 20 | 20 | 20 | 20 | 20 |
| Sulfur | 1.2 | 1.2 | 1.2 | 1.2 | 1.2 |
| Nocceler TBzTD | 1 | 1 | 1 | 1 | 1 |
| SANTOCURE TBSI | 1 | 1 | 1 | 1 | 1 |
| Conditions for electron rays irradiation | | | | | |
| Acceleration voltage (kV) | 150 | 150 | 150 | 150 | 80 |
| Electron current (mA) | 35 | 35 | 35 | 35 | 35 |
| Treatment speed (m/min) | 1.0 | 1.0 | 1.0 | 1.0 | 0.5 |
| MD-1 hardness | | | | | |
| Before electron rays irradiation (°) | 69 | 73 | 69 | 68 | 69 |
| After electron rays irradiation (°) | 74 | 79 | 74 | 71 | 72 |
| Rate of change | 1.08 | 1.08 | 1.06 | 1.04 | 1.05 |
| Fischer hardness | | | | | |
| Before electron rays irradiation (N/mm²) | 1.0 | 1.1 | 0.9 | 1.0 | 1.0 |
| After electron rays irradiation (N/mm²) | 5.7 | 5.9 | 5.3 | 5.5 | 4.3 |
| Rate of change | 5.7 | 5.4 | 5.9 | 5.5 | 4.3 |
| Image evaluation | | | | | |
| Evaluation (1) | B | B | B | B | B |
| Evaluation (2) | A | A | A | A | B |

TABLE 4

| | Examples | | | | |
|---|---|---|---|---|---|
| | 6 | 7 | 8 | 9 | 10 |
| NBR (trade name: "N230SV", content of acrylonitrile: 33%) | 90 | 20 | 80 | 70 | 55 |
| VCR412 | 10 | 80 | 20 | 30 | 45 |
| VCR617 | — | — | — | — | — |
| VCR450 | — | — | — | — | — |
| VCR800 | — | — | — | — | — |
| Carbon black (trade name: Tokablack #7360SB) | 48 | 48 | 48 | 48 | 48 |
| Zinc oxide | 5 | 5 | 5 | 5 | 5 |
| Zinc stearate | 1 | 1 | 1 | 1 | 1 |
| Calcium carbonate | 20 | 20 | 20 | 20 | 20 |
| Sulfur | 1.2 | 1.2 | 1.2 | 1.2 | 1.2 |
| Nocceler TBzTD | 1 | 1 | 1 | 1 | 1 |
| SANTOCURE TBSI | 1 | 1 | 1 | 1 | 1 |
| Conditions for electron rays irradiation | | | | | |
| Acceleration voltage (kV) | 120 | 150 | 150 | 150 | 80 |
| Electron current (mA) | 35 | 35 | 35 | 35 | 35 |
| Treatment speed | 0.8 | 1.0 | 1.0 | 1.0 | 0.5 |

TABLE 4-continued

| | Examples | | | | |
|---|---|---|---|---|---|
| | 6 | 7 | 8 | 9 | 10 |
| (m/min) | | | | | |
| MD-1 hardness | | | | | |
| Before electron rays irradiation (°) | 69 | 57 | 66 | 63 | 59 |
| After electron rays irradiation (°) | 73 | 64 | 72 | 70 | 67 |
| Rate of change | 1.06 | 1.12 | 1.09 | 1.11 | 1.13 |
| Fischer hardness | | | | | |
| Acceleration voltage (kV) | 120 | 150 | 150 | 150 | 150 |
| Before electron rays irradiation (N/mm$^2$) | 1.0 | 1.5 | 1.1 | 1.1 | 1.2 |
| After electron rays irradiation (N/mm$^2$) | 5.0 | 18.7 | 7.6 | 9.4 | 12.2 |
| Rate of change | 5.0 | 12.5 | 6.9 | 8.5 | 10.2 |
| Image evaluation | | | | | |
| Evaluation (1) | B | B | A | A | A |
| Evaluation (2) | B | A | A | A | A |

TABLE 5

| | Comparative Example | | |
|---|---|---|---|
| | 1 | 2 | 3 |
| NBR (trade name: "N230SV", content of acrylonitrile: 33%) | 90 | 55 | 100 |
| VCR412 | 10 | — | — |
| VCR617 | — | — | — |
| VCR450 | — | — | — |
| VCR800 | — | — | — |
| BR1220L | — | 45 | — |
| RB820 | — | — | — |
| Carbon black (trade name: Tokablack #7360SB) | 48 | 48 | 48 |
| Zinc oxide | 5 | 5 | 5 |
| Zinc stearate | 1 | 1 | 1 |
| Calcium carbonate | 20 | 20 | 20 |
| Sulfur | 1.2 | 1.2 | 1.2 |
| Nocceler TBzTD | 1 | 1 | 1 |
| SANTOCURE TBSI | 1 | 1 | 1 |
| Conditions for electron rays irradiation | | | |
| Acceleration voltage (kV) | — | 150 | 150 |
| Electron current (mA) | — | 35 | 35 |
| Treatment speed (m/min) | — | 1.0 | 1.0 |
| MD-1 hardness | | | |
| Before electron rays irradiation (°) | 69 | 61 | 74 |
| After electron rays irradiation (°) | — | 66 | 76 |
| Rate of change | — | 1.09 | 1.02 |
| Fischer hardness | | | |
| Before electron rays irradiation (N/mm$^2$) | 1.0 | 0.8 | 0.9 |
| After electron rays irradiation (N/mm$^2$) | — | 1.9 | 3.8 |
| Rate of change | — | 2.4 | 4.2 |
| Image evaluation | | | |
| Evaluation (1) | D | A | D |
| Evaluation (2) | D | D | B |

In Comparative Example 1, since the surface of the rubber roller was not subjected to the curing treatment through the electron rays irradiation, the surface hardness of the roller was lower than 2.0 N/mm$^2$, and therefore, the evaluation for contamination and the evaluation for the C set were ranked lower than C. In Comparative Example 2, since the butadiene rubber did not include crystalline butadiene in the elastic layer, the surface of the roller was not cured even through the electron rays irradiation, and therefore, the evaluation for the C set was ranked lower than C. In Comparative Example 3, since the elastic layer included the NBR alone, the elastic layer had high polarity, and therefore, the evaluation for contamination was ranked lower than C.

Examples 1 to 10 are covered by the present invention, and hence, the contamination with a toner and the occurrence of the C set were satisfactorily suppressed, and good images with no practical problem were formed.

REFERENCE SIGNS LIST 1 charging roller
11 mandrel
12 elastic layer
21 electrophotographic photosensitive member
21a photosensitive layer
21b support
21c axis
23 power source
23a rubbing power source
24 exposure unit
25 developing unit
26 transferring unit
27 transfer material
28 cleaning unit
31 electron rays generating part
32 irradiation chamber
33 irradiation port
34 terminal
35 accelerating tube
36 filament
37 irradiation port foil
38 rubber roller
39 roller rotating member
41 photosensitive member
42 developing roller
43 toner supplying roller
44 developing blade
45 cleaning blade
46 cleaning apparatus This application claims the benefit of Japanese Patent Application Nos. 2012-060315, filed on Mar. 16, 2012, and 2012-271430, filed on Dec. 12, 2012 are hereby incorporated by reference herein in their entirety.

What is claimed is:
1. An electrophotographic member comprising:
an electro-conductive support, and
an elastic layer provided on the support as a surface layer, wherein:
the elastic layer is formed by irradiating, with electron rays, a rubber layer,
the rubber layer comprising a crosslinked product of a rubber mixture comprising acrylonitrile butadiene rubber and polybutadiene,
the polybutadiene includes 1,2-syndiotactic polybutadiene,
the elastic layer has a higher crosslink density in a surface portion than in an inside portion thereof, the higher crosslink density being due to a cleavage of a 1,2-vinyl bond of the 1,2-syndiotactic polybutadiene with the irradiation of the electron rays, a mixing ratio in the rubber mixture between the acrylonitrile butadiene rubber and the polybutadiene is 90 parts by mass: 10 parts by mass to 20 parts by mass: 80 parts by mass, and a content of the 1,2-syndiotactic polybutadiene in the polybutadiene is 3.8 mass % or more and 20 mass % or less.

2. The electrophotographic member according to claim 1, wherein the polybutadiene has:

a matrix containing polybutadiene including a cis-1,4 bond and a trans-1,4 bond; and a domain containing the 1,2-syndiotactic polybutadiene.

3. The electrophotographic member according to claim 2, wherein a content of the cis-1,4 bond in an n-hexane-soluble matter of the polybutadiene is 94 mass % or more and 99 mass % or less.

4. A process cartridge comprising a charging member integrated with an electrophotographic photosensitive member disposed to be chargeable by the charging member, the process cartridge having a structure removably attached to a main body of an electrophotographic apparatus, wherein the charging member is an electrophotographic member according to claim 1.

5. An electrophotographic apparatus comprising a charging member and an electrophotographic photosensitive member disposed to be chargeable by the charging member, wherein the charging member is an electrophotographic member according to claim 1.

* * * * *